United States Patent [19]

Yoshinaga et al.

[11] Patent Number: 4,744,642

[45] Date of Patent: May 17, 1988

[54] MICROSCOPE

[75] Inventors: Makoto Yoshinaga; Yoichi Iba; Noriyuki Miyahara; Masami Kawasaki; Terumasa Morita; Takashi Nagano, all of Hachiouji, Japan

[73] Assignee: Olympus Optical Co., Ltd., Tokyo, Japan

[21] Appl. No.: 928,682

[22] Filed: Nov. 7, 1986

Related U.S. Application Data

[63] Continuation of Ser. No. 748,564, Jun. 25, 1985, abandoned.

[30] Foreign Application Priority Data

Jun. 25, 1984 [JP] Japan ................. 59-129204
Dec. 29, 1984 [JP] Japan ................. 59-279663
Dec. 29, 1984 [JP] Japan ................. 59-279664
Feb. 4, 1985 [JP] Japan ................. 60-18771

[51] Int. Cl.⁴ .................... G02B 7/02; G02B 21/00; G02B 21/06
[52] U.S. Cl. ........................... 350/518; 350/507; 350/527
[58] Field of Search ............... 350/415, 453, 507, 518, 350/521, 529, 530, 531, 532, 527

[56] References Cited

U.S. PATENT DOCUMENTS

| 2,464,793 | 1/1949 | Cooke ................. 350/409 |
| 3,580,682 | 5/1971 | Iliescu ................. 356/394 |
| 3,641,648 | 2/1972 | Kalberman ........... 350/532 |
| 4,007,326 | 2/1977 | Bernsen ............... 356/394 |
| 4,040,746 | 8/1977 | Lietar ................. 356/394 |
| 4,209,225 | 6/1980 | Abe et al. ............ 350/518 |
| 4,353,624 | 10/1982 | Yonekubo ............ 350/472 |
| 4,417,789 | 11/1983 | Kano ................. 350/513 |
| 4,448,498 | 5/1984 | Muller et al. ........ 350/518 |

FOREIGN PATENT DOCUMENTS 0054127 6/1982 European Pat. Off. ........... 350/518
59-86020 5/1984 Japan .

Primary Examiner—John K. Corbin
Assistant Examiner—Ronald M. Kachmarik
Attorney, Agent, or Firm—Cushman, Darby & Cushman

[57] ABSTRACT

A microscope wherein, in order that the observing position may be variable over a wide range of a sample to be observed without requiring a large objective, the objective optical system is so formed as to be movable in parallel with the sample surface and the light path length between the objective optical system and eyepiece optical system is made variable by moving the objective optical system.

15 Claims, 6 Drawing Sheets

1

MICROSCOPE

This is a continuation of application Ser. No. 748,564, filed June 25, 1985 now abandoned.

BACKGROUND OF THE INVENTION (a) Field of the Invention

This invention relates to a microscope whereby a sample can be observed over a wide range.

(b) Description of the Prior Art

Generally a microscope is formed fundamentally of an objective, an eyepiece and a stage for holding a sample observing position, the sample held on the stage or the stage itself used to be moved in the direction vertical to the optical axis. However, with the recent development of the peripheral technique, such large samples as brain slices and large silicon wafers have increased. Therefore, in the case of observing such large sample, the stage mounting the sample must be moved in a wide range, that is, over the range B which is 4 times as large as the range A to be observed in FIG. 1, therefore the strength of the entire microscope including the stage is required and the stage moving mechanism must be large. For example, if the size of the sample to be observed becomes twice as large, the stage moving range will become 4 times as large, therefore, the entire microscope will be larger, the inertia of the stage itself will be larger and therefore the position precision will be more difficult to control.

On the other hand, according to Japanese preliminary patent publication Sho No. 59-86020, there is suggested a method wherein a first objective and second objective are provided and only the first objective is moved in the direction perpendicular to the optical axis to change the sample observing position. However, there are defects that, in order to change the observing position of a large sample by this method, a very large objective will be required, the observable range will be varied by the magnification of the objective and further so large observing range will not be obtained due to the field number of the eyepiece.

SUMMARY OF THE INVENTION

Therefore, a primary object of the present invention is to provide a microscope whereby the sample observing position can be varied over a wide range without requiring a large objective.

According to the present invention, this object can be attained by moving the objective optical system parallelly with the visual field plane to make the light path length of a part of the observing optical system free to extend and contract.

Another object of the present invention is to simplify the entire structure of this kind of microscope and to lower the height of the microscope part above the sample.

A further object of the present invention is to provide this kind of microscope wherein such other optical systems as an illuminating optical system and reference optical system can be easily and compactly incorporated into the objective optical system.

Another further object of the present invention is to provide this kind of microscope wherein, in spite of the movement of the objective optical system in a wide range, the position of the eye point for the eyepiece will not move.

Another further object of the present invention is to provide a microscope device which can be favorably utilized to inspect wafers and the like.

These and other objects of the present invention will become more apparent during the course of the following detailed description and appended claims.

DESCRIPTION OF THE PREFERRED EMBODIMENTS

Figure 1:
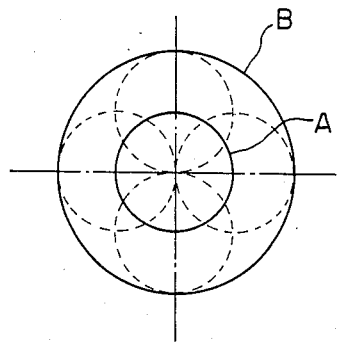
FIG. 1 is an explanatory view showing a stage moving range in a conventional microscope.
Figure 2:
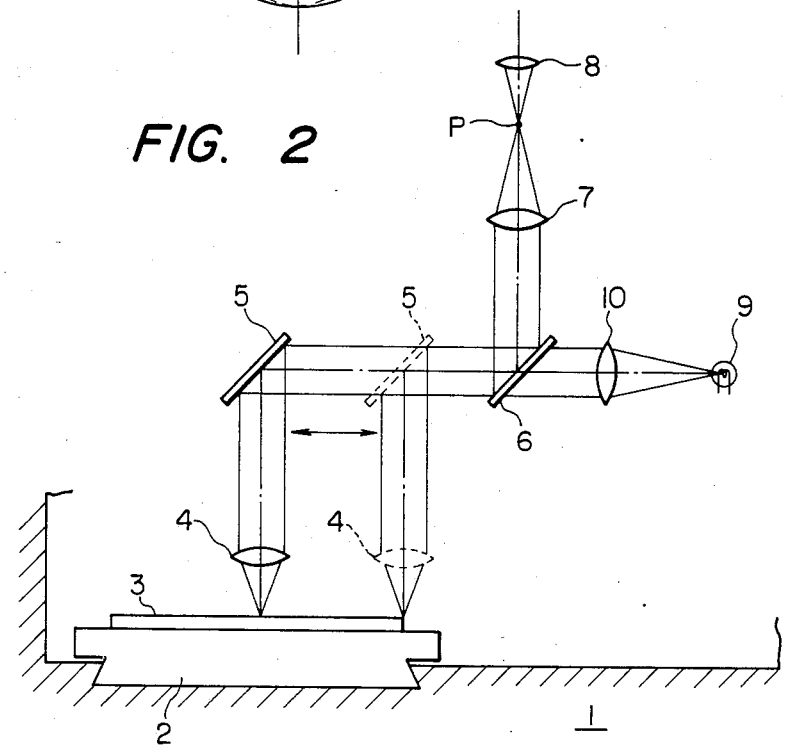
FIG. 2 is a schematic view showing a first embodiment of the microscope according to the present invention.

First of all, with reference to FIG. 2, an embodiment arranged so that an objective optical system moves in one dimensional way shall be explained. In FIG. 2, the reference numeral 1 represents a microscope body, 2 represents a stage movably mounted in a well known way on the microscope body, 3 represents a sample to be observed as placed on the stage, 4 represents an infinity objective, 5 represents a mirror, 6 represents a half mirror, 7 represents an image forming lens, 8 represents an eyepiece, 9 represents an illuminating light source and 10 represents a collector lens. The objective 4 and mirror 5 are arranged movably along the optical axis between the mirror 5 and half mirror 6 by such mechanism as is described later.

Figure 3:
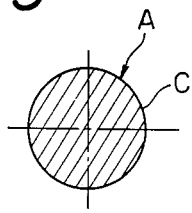
FIG. 3 is a view showing the objective moving range of the present invention.

According to the above described formation, the light emitted out of the illuminating light source 9 will pass the half mirror 6 through the collector lens 10, will be reflected by the mirror 5 and will illuminate the sample 3 through the objective 4. The light coming out of the thus illuminated sample 3 will be made an afocal light by the objective 5, will be reflected by mirror 5 and half mirror 6 and will be made to form an image in the position P by the image forming lens 7. This image will be observed through the eyepiece 8. Here, in the observing optical system consisting of the objective 4 mirror 5, half mirror 6, image forming lens 7 and eyepiece 8, as an afocal system is made between the objective 4 and image forming lens 7, even if the light path length between the mirror 5 and half mirror 6 is varied by advancing and retreating the objective 4 and mirror 5 along the optical axis between the mirror 5 and half mirror 6, the image formation in the position P will not vary and therefore the sample 3 will be able to be observed in any position. In such case, the moving range C of the objective 4 may be the same as the observing range A as shown in FIG. 3.

Figure 4:
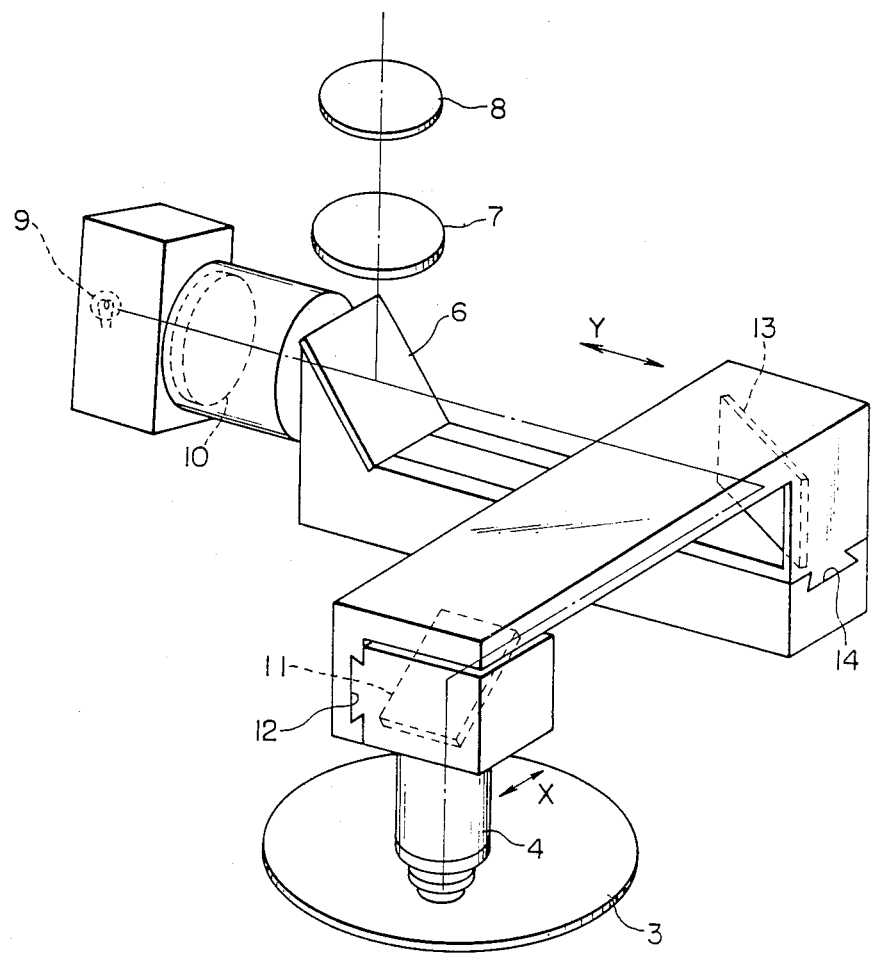
FIG. 4 is a schematic perspective view showing a second embodiment of the microscope according to the present invention.

FIG. 4 shows the second actual embodiment of the present invention in which an objective optical system is arranged so as to move in two dimensional way. The reference numeral 11 represents a first mirror arranged slidably in the direction X along such guide 12 as, for example, a dovetail together with the objective 4, 13 represents a second mirror arranged slidably in the direction Y along a guide 14 formed the same as the guide 12 integrally with the objective 4, first mirror 11 and guide 12. The same as in the embodiment shown in FIG. 2, the light coming out of the sample 3 will be made an afocal light by the objective 4, will be reflected in the direction X by the first mirror 11, will be reflected in the direction Y by the second mirror 13, will be further reflected by the half mirror 6 and then will be made to form an image by the image forming lens 7. This image will be observed through the eyepiece 8. Therefore, by properly adjusting the light path length between the first mirror 11 and second mirror 13 with the guide 12 and the light path length between the second mirror 13 and half mirror 6 with the guide 14, the objective 4 can be moved in the directions X and Y without varying the image forming position and the sample 3 can be observed in any position. Thus, such large sample as a brain slice or large silicon wafer can be easily and precisely observed.

Figure 5:
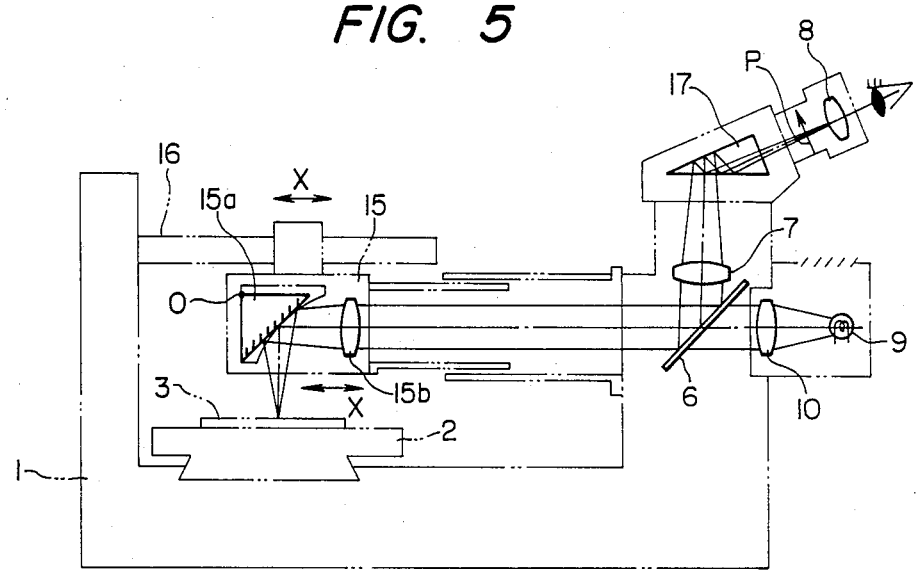
FIG. 5 is a schematic view showing a third embodiment of the microscope according to the present invention.

FIG. 5 shows the third embodiment of the present invention in which an objective optical system is arranged so as to move in one dimensional way. In respect that the objective optical system and reflecting member are so formed as to move integrally along the optical axis, this embodiment is fundamentally different from the embodiments shown in FIGS. 2 and 4. That is to say, the reference numeral 15 represents an objective unit including a mirror 15a and objective 15b and mounted movably along the optical axis of the objective 15b, that is, in the direction indicated by the arrow X on a guide rail 16 provided in the microscope body 1 and 17 represents a prism arranged between the image forming lens 7 and eyepiece 8 and directing obliquely upward the light having passed the image forming lens 7. The illuminating light progressing course to the sample 3 from the illuminating light source 9 and the observing light progressing course to the eyepiece 8 from the sample are the same as in the case of the already described embodiments. Even in this embodiment, in the observing optical system consisting of the mirror 15a, objective 15b, half mirror 6, image forming lens 7, prism 17 and eyepiece 8, as an afocal system is made between the objective 15b and image forming lens 7, by sliding the objective unit 15 along the guide rail 16, the mirror 15a and objective 15b can be moved along the optical axis of the objective 15b to vary the light path length between the objective 15b and half mirror 6, the stage 2 can be moved in the direction vertical to the upper surface with respect to the microscope body 1 to observe the sample 3 on the stage 2 in any second dimensional position and yet the image formation in the position P will not vary. In this case, too, the moving range of the objective 15b may be the same as the maximum width of the observing range. (See FIG. 3).

Figure 6:
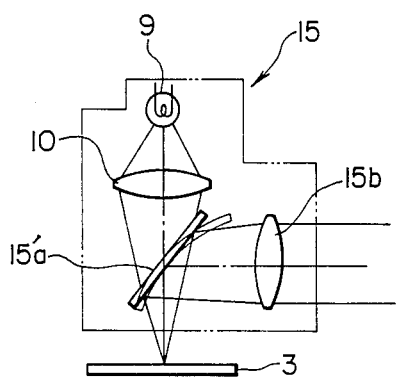
FIG. 6 is a schematic view of an essential part showing a fourth embodiment of the microscope according to the present invention.

FIG. 6 shows the fourth embodiment of the present invention. In respect that a half mirror 15'a is provided instead of the mirror 15a and the illuminating light source 9 and collector lens 10 are included within the objective unit 15, this embodiment is different from the embodiment shown in FIG. 5. The collector lens 10 and illuminating light source 9 are arranged above the half mirror 15'a. Even in this embodiment, the operation is made the same as in the embodiment in FIG. 5 but, as the illuminating optical system is incorporated within the objective unit, there are advantages that the flare will reduce, the pupil position of the illuminating optical system will be kept invariable and therefore a uniform illumination will be made.

Figure 7:
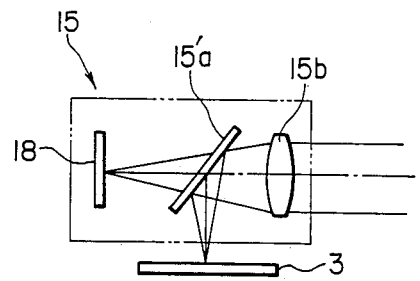
FIG. 7 is a schematic view of an essential part showing a fifth embodiment of the microscope according to the present invention.

FIG. 7 shows the fifth embodiment of the present invention. In respect that the half mirror 15'a is provided instead of the mirror 15a and a master specimen 18 is included within the objective unit 15, this embodiment is different from the embodiment shown in FIG. 5. The master specimen 18 is arranged in a position conjugate with the sample 3 with respect to the half mirror 15'a and is so formed that the sample 3 and master specimen 18 can be observed while being compared with each other within the same visual field.

In the above mentioned third to fifth embodiments, each of the mirror 15a and half mirror 15'a may have a predetermined curvature (such as of a parabolic or spherical surface) of the reflecting surface as shown by chain lines respectively in FIGS. 5 and 6 or the mirror 15a can be rotated around the axis 0 (FIG. 5) to be minutely centered with the sample 3. If a mirror or half mirror having a reflecting surface of a proper curvature is used, the objective 15b will be able to be omitted. Further, in each of these embodiments, an afocal system is formed between the objective 15b and image forming lens 7 but it is needless to say that, even in the case of a focal system, the above mentioned advantages peculiar to the respective embodiments will be obtained the same. Further, in these embodiments, as evident from the above described explanation, the height of the microscope device part to be above the sample 3 can be made comparatively low and even an objective of a long operating distance can be also used. Further, in case a part of the microscope optical system is formed as an afocal system, the part of the afocal system will be short, therefore the eclipse of the pupil of the afocal system will reduce, the diameter of the image forming lens will be able to be made smaller, thus the entire microscope will be able to be made small and such very effective microscope will be obtained. Further, in case the half mirror is arranged in front of the objective optical system, such other optical systems with respect to the half mirror as, for example, an illuminating optical system and second reference optical system will be able to be easily incorporated without making the device large.

Figure 8A:
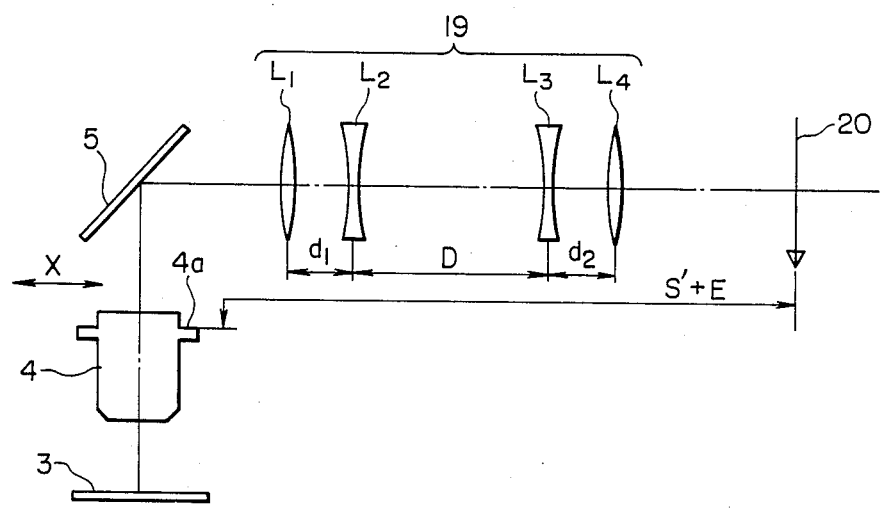
FIGS. 8A and 8B are schematic views showing a sixth embodiment of the microscope according to the present invention.
Figure 8B:
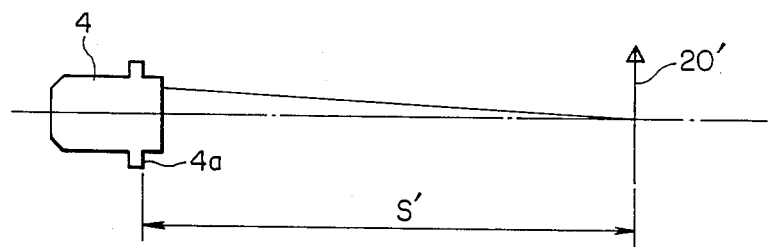

FIGS. 8A and 8B show the sixth embodiment of the present invention in which an objective optical system is arranged so as to move in one dimentional way. In respect that an afocal 1× relay lens system consisting of a plurality of lens components is arranged between the objective optical system and eyepiece optical system so that, when the objective optical system is moved, the distances between the respective lens components forming the relay lens system, the distance between the relay lens system and objective system and the distance between the relay lens system and eyepiece optical system will be varied in response to the movement of the objective optical system so as to keep the entire relay lens system always afocal 1×, this embodiment is different from the already described embodiments. This embodiment shall be concretely explained on the basis of FIGS. 8A and 8B. Even in this embodiment, the same reference numerals are attached to the same respective members as in the already described embodiments. In FIG. 8A, the reference numeral 19 represents a relay lens system consisting of four lenses $L_1$, $L_2$, $L_3$ and $L_4$ and so formed that, when the respective lenses are approximated with thin lenses, the distances between the respective lenses will be adjusted to satisfy the following formulae to always make an afocal 1× system. That is to say, $$d_2 = \frac{d_1\phi_1\phi_2 - \phi_1 - \phi_2 + \phi_3 + \phi_4}{\phi_3\phi_4}$$

$$D = \frac{1}{\phi_2 - \frac{\phi_1}{d_1\phi_1 - 1}} + \frac{1}{\phi_3 - \frac{\phi_4}{d_2\phi_4 - 1}}$$

$$E = D + \frac{1}{\phi_1 - \frac{\phi_2}{d_1\phi_2 - 1}} + \frac{1}{\phi_4 - \frac{\phi_3}{d_2\phi_3 - 1}} + d_1 + d_2$$

where $\phi_1$, $\phi_2$, $\phi_3$ and $\phi_4$ represent respectively the powers of the lenses $L_1$, $L_2$, $L_3$ and $L_4$, $\phi_1 > 0$, $\phi_2 > 0$, $\phi_3 > 0$ and $\phi_4 > 0$, $d_1$ represents the distance between the lenses $L_1$ and $L_2$, $d_2$ represents the distance between the lenses $L_3$ and $L_4$, $D$ represents the distance between the lenses $L_2$ and $L_3$ and $E$ represents the displacement of the image by the insertion of the relay lens system of the lenses $L_1$ to $L_4$.

The reference numeral 20 represents the image of the sample 3 formed by the objective 4, mirror 3 and relay lens system 19. The reference symbol S' represents the distance from the fitting face 4a of the objective 4 to the image 20' of the sample 3 to be formed by only the objective 4 (FIG. 8B). By the way, as examplified in FIG. 4, the objective 4 and mirror 5 are so formed as to be movable integrally as an objective unit in parallel with the plane including the sample 3, that is, in the direction X and the respective lenses $L_1$, $L_2$, $L_3$ and $L_4$ of the relay lens system 19 are so made that, in response to the movement of the above mentioned objective unit, the distances between the respective lenses, the distance between the relay lens system 19 and objective 4 and the distance between the eyepiece not illustrated and relay lens system will be respectively adjusted and the position of the image 20 will not move. Therefore, the light coming out of the sample 3 will pass the objective 4, then will be reflected by the mirror 5 and further will pass the relay lens system 19 to form the image 20 which will be observed though the eyepiece. Here, as the relay lens system 19 is so formed as to be always an afocal 1× system, when the objective 4 and mirror 5 is moved in the direction indicated by the arrow X and the distances between the respective lenses $L_1$, $L_2$, $L_3$ and $L_4$ are adjusted in response to the movement of the objective unit, the image 20 will be formed at a fixed magnification in a fixed position, that is, the position of the entrance pupil of the eyepiece. Thus the sample can be observed in any position over a wide range. Yet the distance from the image 20 to the exit pupil will not vary and therefore the position of the eye point will not vary. In this case, the objective 4 moving range may be the same as the maximum length of the observing range.

Figure 9:
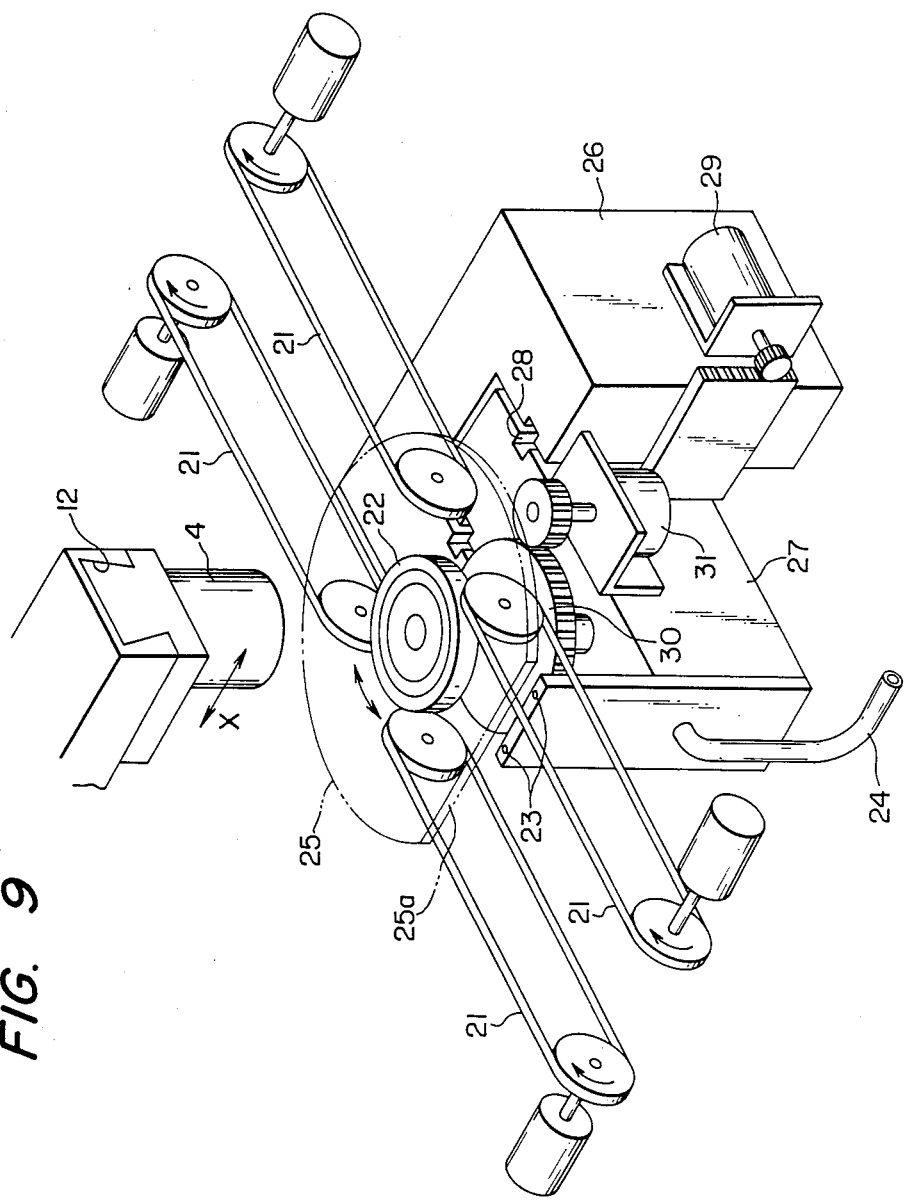
FIG. 9 is a perspective view showing a seventh embodiment of the present invention as applied to a wafer inspecting microscope.

FIG. 9 shows the seventh embodiment of the present invention. In respect that the stage 3 is so formed as to make no linear motion but a rotary motion, this embodiment is different from the already described embodiments. The embodiment is illustrated as applied to a wafer inspecting microscope. That is to say, the reference numeral 21 represents two pairs of wafer conveying belts driven by a motor, 22 represents a wafer inspecting stage provided in the middle of a wafer conveying path and 23 represents a noncontacting prealignment sensor provided adjacently to the stage 22. The wafer inspecting stage 22 is connected with a vacuum pump not illustrated through a suction pipe 24 so as to suck and hold a wafer 25 placed on the upper surface and is moved vertically and rotated in a horizontal plane by the later described stage driving position. The reference numeral 26 represents a first frame forming a part of the microscope body 1, 27 represents a second frame fitted vertically movably through a roller guide 28 to the first frame 26, driven by a motor 29 and having the wafer inspecting stage 22 pivoted to the upper part and 30 represents a gear secured to the center shaft of the wafer inspecting state 22 and rotated by a motor 31 to rotate the wafer inspecting stage 22 in a horizontal plane. These form the stage driving device.

As this embodiment is formed as mentioned above, the wafer 25 fed onto the stage 22 by the conveying belt 21 will be sucked and held on the wafer inspecting stage 22 by vacuum suction. Then, by the stage driving device, the wafer inspecting stage 22 is raised up to the in-focus position. Then, the wafer inspecting stage 22 is rotated by the stage driving device. By the noncontacting alignment sensor 23, the orientation flat 25a of the wafer 25 is detected and positioned. The wafer inspecting stage 22 is further rotated by the stage driving device to inspect the wafer. On the other hand, if, in addition, the objective 4 is moved along the upper surface of the wafer 25 in the direction (X) at right angles with the wafer conveying direction, the wafer 25 will be able to be inspected on the entire surface. In this case, if an image rotator is provided within the observing optical system of the microscope as described later, the rotation of the image with the rotation of the wafer 25 will be able to be prevented and the always stationary image will be able to be observed. In the case of this embodiment, there is an advantage that, when the diameter of the wafer is represented by R, the displacement of the objective 4, that is, the variation of the light path length of the observing optical system may be R/2.

In each of the above explained embodiments, the objective unit is moved linearly in the directions X and/or Y in a plane parallel with the surface of the stage, that is, of the object to be observed in cooperation, in some cases, with the linear or rotary motion of the stage to attain the intended purpose. However, the objective unit may be rocked in a plane parallel with the stage in cooperation with the linear motion of the stage to attain the purpose.

Figure 10:
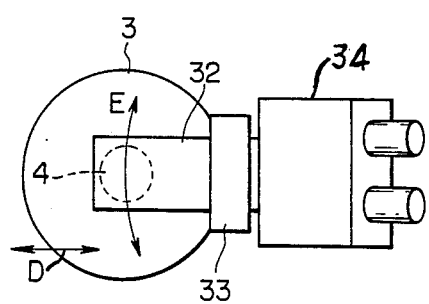
FIG. 10 is a plan view of an essential part showing an eighth embodiment of the microscope according to the present invention.
Figure 11:
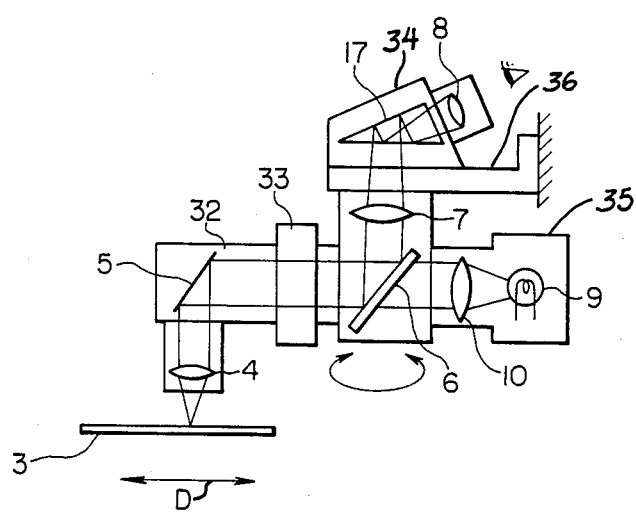
FIG. 11 is a side view of the embodiment shown in FIG. 10.

FIGS. 10 and 11 show the eighth embodiment of the present invention based on such system. That is to say, in this embodiment, the eyepiece part 34 is fixed but such other parts as the light source part 35 and observing tube 32 are made rotatable on an arm 36 in a horizontal plane with the optical axis of the image forming lens 7 as a center so that the objective 4 may move in an arcuate direction (direction indicated by the arrow E in FIG. 10) intersecting the stage 2 or in the moving direction D of the sample 3. In this case, there are advantages that the light path length between the mirror 5 and half mirror 6 need not be varied and the design of the microscope optical system is easy. However, as the image rotates with the rotation of the observing tube 32, it is necessary to put an image rotator 33 in the course of the optical system. As evident from the above explanation, according to this embodiment, there is an advantage that the entire device can be formed compactly.

We claim:

1. A microscope, comprising:
   a microscope body;
   a stage mounted on said microscope body;
   an objective optical system mounted movably in parallel with the surface of said stage on said microscope body and an eyepiece optical system which is fixedly mounted on said microscope body and through which the image of the light having passed said objective optical system and coming out of a sample placed on said stage can be observed, a light path length between said objective optical system and eyepiece optical system being variable by moving said objective optical system;
   an afocal 1× relay lens system consisting of a plurality of lens components arranged between said objective optical system and eyepiece optical system to relay an image of the sample formed by said objective optical system to the position of the entrance pupil of said eyepiece optical system and a reflecting member arranged between said stage surface and relay lens system and for arranging at least the light path of said relay lens system parallelly with the surface of said sample, said objective optical system and reflecting member being integrally movable in parallel with the surface of said sample and, in response to the movement of said objective optical system and reflecting member, the distances between the respective lens components of said relay lens system being varied so that said relay lens system may be kept afocal 1×.

2. A microscope according to claim 1 wherein said objective optical system is linearly movable.

3. A microscope according to claim 1 wherein said objective optical system is linearly movable in directions intersecting at right angles with each other.

4. A microscope according to claim 1 wherein said reflecting member is rockable around the optical axis of said reflecting member.

5. A microscope according to claim 1 wherein said objective optical system is formed of a reflecting member having a reflection surface of a predetermined curvature and bending the light path of the light out of said sample so as to be in parallel with the surface of said stage.

6. A microscope according to claim 5 wherein said reflecting member is rockable around the optical axis of said reflecting member.

7. A microscope according to claim 1 wherein said objective optical system is formed as an objective unit including an infinity objective, a half mirror bending the light path of the light out of said sample so as to be in parallel with the surface of said stage and an illuminating light source means projecting an illuminating light onto the surface of said sample through said half mirror.

8. A microscope according to claim 1 wherein said objective optical system is formed as an objective unit including a half mirror having a reflecting surface of a predetermined curvature and bending the light path of the light out of said sample so as to be in parallel with the surface of said stage and an illuminating light source means projecting an illuminating light onto the surface of said sample through said half mirror.

9. A microscope according to claim 1 wherein said objective optical system is formed as an objective unit including an infinity objective, a half mirror bending the light path of light out of said sample so as to be in parallel with the surface of said stage and a master specimen for forming the image of the master specimen within said eyepiece optical system through said half mirror and objective.

10. A microscope according to claim 1 wherein said stage is moved to rotate and said objective optical system is moved linearly across the rotation center of said stage.

11. A microscope according to claim 1 wherein said stage is moved linearly and said objective optical system is rocked so as to intersect with the moving direction of said stage in a plane parallel with the surface of said stage.

12. A microscope according to claim 1 wherein:
   said relay lens system is formed of four lens components $L_1$, $L_2$, $L_3$ and $L_4$ and the distance $d_1$ between the lens components $L_1$ and $L_2$, the distance $D$ between the lens components $L_2$ and $L_3$ and the distance $d$ between the lens components $L_3$ and $L_4$ are adjusted to satisfy the following formulae when said four lens components are approximated respectively with thin lenses:

$$d_2 = \frac{d_1\phi_1\phi_2 - \phi_1 - \phi_2 + \phi_3 + \phi_4}{\phi_3\phi_4}$$

$$D = \frac{1}{\phi_2 - \frac{\phi_1}{d_1\phi_1 - 1}} + \frac{1}{\phi_3 - \frac{\phi_4}{d_2\phi_4 - 1}}$$

$$E = D + \frac{1}{\phi_1 - \frac{\phi_2}{d_1\phi_2 - 1}} + \frac{1}{\phi_4 - \frac{\phi_3}{d_2\phi_3 - 1}} + d_1 + d_2$$

where $\phi_1$ represents the power of the lens component $L_1$, $\phi_2$ represents the power of the lens component $L_2$, $\phi_3$ represents the power of the lens component $L_3$, $\phi_4$ represents the power of the lens component $L_4$, $\phi_1 > 0$ or $\phi_2 > 0$, $\phi_3 > 0$ or $\phi_4 > 0$, and E represents the displacement of the image by the lens components $L_1$ to $L_4$.

13. A microscope according to claim 1 wherein said objective optical system is formed as an objective unit including an infinity objective and a reflecting member bending the light path of the light out of said sample so as to be in parallel with the surface of said stage.

14. A microscope suitable for observing a sample having a flat surface, comprising:
   a microscope body;
   a stage movably mounted on said microscope body;
   an objective optical system mounted movably in parallel with the surface of said stage on said microscope body and an eyepiece optical system which is fixedly mounted on said microscope body and through which the image of the light having passed said objective optical system and coming out of a sample placed on said stage can be observed, a light path length between said objective optical system and eyepiece optical system being variable by moving said objective optical system;

an afocal 1× relay lens system consisting of a plurality of lens components arranged between said objective optical system and eyepiece optical system to relay an image of the sample formed by said objective optical system to the position of the entrance pupil of said eyepiece optical system and a reflecting member arranged between said stage surface and relay lens system and for arranging at least the light path of said relay lens system parallelly with the surface of said sample, said objective optical system and reflecting member being integrally movable in parallel with the surface of said sample and, in response to the movement of said objective optical system and reflecting member, the distances between the respective lens components of said relay lens system being varied so that said relay lens system may be kept afocal 1×.

15. A microscope according to claim 14 wherein said relay system is formed of four lens components $L_1$, $L_2$, $L_3$ and $L_4$ and the distance $d_1$ between the lens components $L_1$ and $L_2$, the distance $D$ between the lens components $L_2$ and $L_3$ and the distance $d_2$ between the lens components $L_3$ and $L_4$ are adjusted to satisfy the following formulae when said four lens components are approximated respectively with thin lenses:

$$d_2 = \frac{d_1\phi_1\phi_2 - \phi_1 - \phi_2 + \phi_3 + \phi_4}{\phi_3\phi_4}$$

$$D = \frac{1}{\phi_2 - \frac{\phi_1}{d_1\phi_1 - 1}} + \frac{1}{\phi_3 - \frac{\phi_4}{d_2\phi_4 - 1}}$$

$$E = D + \frac{1}{\phi_1 - \frac{\phi_2}{d_1\phi_2 - 1}} + \frac{1}{\phi_4 - \frac{\phi_3}{d_2\phi_3 - 1}} + d_1 + d_2$$

where $\phi_1$ represents the power of the lens component $L_1$, $\phi_2$ represents the power of the lens component $L_2$, $\phi_3$ represents the power of the lens component $L_3$, $\phi_4$ represents the power of the lens component $L_4$, $\phi_1 > 0$ or $\phi_2 > 0$, $\phi_3 > 0$ or $\phi_4 > 0$, and E represents the displacement of the image by the lens components $L_1$ to $L_4$.

* * * * *